United States Patent
Biermann et al.

(10) Patent No.: US 12,255,894 B2
(45) Date of Patent: Mar. 18, 2025

(54) METHOD AND SYSTEM FOR RUNNING AN IDENTITY AND ACCESS MANAGEMENT SYSTEM

(71) Applicant: Service Layers GmbH, Munich (DE)

(72) Inventors: Jürgen Biermann, Grünwald (DE);
Daniel Deckers, Stuttgart (DE);
Timothy Clayton Hobbs, Barcelona (ES); Tobias Hülsken, Stuttgart (DE);
Heiko Hütter, Hochdorf (DE); Andre Priebe, Ostfildern (DE)

(73) Assignee: Service Layers GmbH, Munich (DE)

( * ) Notice: Subject to any disclaimer, the term of this patent is extended or adjusted under 35 U.S.C. 154(b) by 249 days.

(21) Appl. No.: 17/774,523

(22) PCT Filed: Oct. 6, 2020

(86) PCT No.: PCT/DE2020/100870
§ 371 (c)(1),
(2) Date: May 5, 2022

(87) PCT Pub. No.: WO2021/089083
PCT Pub. Date: May 14, 2021

(65) Prior Publication Data
US 2022/0394030 A1    Dec. 8, 2022

(30) Foreign Application Priority Data

Nov. 5, 2019   (DE) ............... 20 2019 106 136.7
Nov. 5, 2019   (DE) ............... 102019129762.1

(51) Int. Cl.
*G06F 8/61*     (2018.01)
*H04L 9/40*     (2022.01)

(52) U.S. Cl.
CPC ........... *H04L 63/0876* (2013.01); *G06F 8/61* (2013.01)

(58) Field of Classification Search
None
See application file for complete search history.

(56) References Cited

U.S. PATENT DOCUMENTS 10,296,305 B2 *   5/2019   Petri ............... H04L 67/01
10,586,025 B2 *   3/2020   Chen ............... G06F 21/31
11,108,831 B2 *   8/2021   Schlotman, Jr. .... H04L 41/0813
2005/0044423 A1   2/2005   Mellmer et al.
2010/0241756 A1*  9/2010   Lee ............... H04W 36/0038
                                                709/229
2013/0238751 A1*  9/2013   Raleigh ........... H04L 67/562
                                                709/217
2016/0028717 A1   1/2016   Apeldorn et al.
2016/0239272 A1   8/2016   Petri

FOREIGN PATENT DOCUMENTS

DE        10055684 A1 *  5/2001   ......... G06F 16/9577
DE     102013102487 A1   9/2014
WO         0133416 A1    5/2001
WO      2015044374 A1    4/2015

OTHER PUBLICATIONS

Mielke Marc, "Computer System For Creating Personalized Data Outputs Composes Derived Information Individually For User By Interpreting Instructions Based On Control Language" translation of DE 10055684 A1 (Year: 2001).*
Computer System For Creating Personalized Data Outputs Composes Derived Information Individually For User By Interpreting Instructions Based On Control Language (Year: 2001).*
European Telecommunications Standards Institute (ETSI), "SmartM2M; Landscape for Open Source and Standards for Cloud Native Software Applicable for a Virtualized IoT Service Layer", ETSI Draft Specification, Mar. 2018, pp. 1-62, Retrieved from the Internet: docbox.etsi.org/SmartM2M/SmartM2M/70-Draft/00103528/SmartM2M-103528v020.docx [retrieved on Mar. 9, 2018].

* cited by examiner

Primary Examiner — Marina Lee
(74) Attorney, Agent, or Firm — Thompson Coburn LLP

(57) ABSTRACT

A method for running an identity and access management system includes providing at least one layer, and a master computer that communicates with at least one slave computer. The master computer has at least one component which is designed as a computing device and/or as a memory device and/or as a further working component respectively. Units of the functionality of the computing device and/or of the memory device and/or of the further working component of the master computer, respectively, are generated. The respective units of the functionality of the computing device and/or of the memory device and/or of the functionality of the further working component, respectively, are converted into a code and are transmitted in coded form from the master computer to the slave computer. The master computer is controlled with the aid of the computing device and a software program.

25 Claims, No Drawings

METHOD AND SYSTEM FOR RUNNING AN IDENTITY AND ACCESS MANAGEMENT SYSTEM

CROSS-REFERENCE TO RELATED APPLICATIONS

This application is a U.S. National Phase application of PCT/DE2020/100870, published as WO 2021/089083, filed on Oct. 6, 2020, which claims priority to German patent application ser. nos. 10 2019 129 762.1 and 20 2019 106 136.7, both filed on Nov. 5, 2019, the disclosures all of which are incorporated by reference herein.

The invention relates to a method and an associated system for executing an identity and access management system. In the method and the system, at least one layer is provided for structuring information and/or data. In the method and the associated system, a master computer communicates with at least one slave computer.

From DE 2013 102 487 A 1 a method for controlling access to digital data is known.

The method comprises a mobile terminal with a network interface. A spatially limited network segment is provided, which provides a network-technical solution. The network solution ensures that the localisation of the mobile terminal takes place. The network segment is also identified. In addition, a user server is arranged that controls access to digital data and ensures compliance with specific rights.

Identity and access management procedures are known in the state of the art for digital markets. These provide functions to enable users to access IT systems. All identities are primarily about efficiency, compliance, user-friendliness and security. Users can be all holders of digital identities, for example consumers, employees, B2B partners, alumni or applicants.

They are important, for example, to be able to reliably introduce products and services into markets worldwide. Often, only very narrow time windows are available for this. Especially in the case of digital services, the "time-to-market" factor is a decisive success factor. This refers to the time span with which new products and/or services can be introduced into a market from the development stage.

In addition, digital platforms offer the opportunity to test new business models and implement them in the market.

The speed and flexibility with which the new business models can be implemented in the respective market has become a decisive competitive factor.

No less important is the speed with which the business models can be tested and/or adapted to the respective market conditions. Another competitive factor is the speed with which a new business model can be integrated into an already existing infrastructure.

The interfaces between the product and/or service introduced into the market and the respective user represent a new area of conflict. Here it must be clarified who the respective user is. It must be possible to reliably confirm the identity of the user. Furthermore, it must be determined how a consistent experience of the provider with the new product and/or the new service can be determined across all associated device interfaces.

For this, it is essential to implement a powerful Identity and Access Management (IAM) system.

Identity and Access Management (IAM)

An identity and access management system provides a framework that includes strategies and technologies to ensure that the right person, preferably in a company, possesses the necessary access rights.

With the authorization the person is granted specific rights vis-à-vis third parties. Through authentication, the person provides proof that he/she has been granted the above-mentioned rights. Through authentication, the person provides proof that he/she can be repeatedly recognised by third parties. The terms authentication, authorization and identification are explained in more detail below.

The identity and access management system relates preferably, but not exclusively, to dealing with customers. In this context, the term "Customer Identity and Access Management (CIAM)" is commonly used.

However, the identity and access management system can also be applied to other contexts, such as employees, B2B partners, alumni or applicants.

For reasons of simplification, the invention will be explained in more detail below by way of example, in connection with customers, under the term "Customer Identity and Access Management".

In the following, the term "customer identity and access management" will be used in the same way as the term "customer identity and access management system".

Customer Identity and Access Management clarifies the identity of the customer (who is who?) in the sense of invention. It also clarifies what the respective customer is allowed to do (who is allowed to do what?).

Customer Identity and Access Management maps the identity of the customer in all its facets securely and reliably. With the help of customer identity and access management, the identity of the customer can be reliably checked and protected.

Securing the identity of the customer is in the foreground. To secure the identity, a password can be assigned. In addition, a two-factor authentication system can be used. Furthermore, biometric characteristics of the customer can be queried with different technical procedures.

After establishing the identity of the customer (identification) and after clarifying the question what the respective customer is allowed to do (authentication), a digital profile of the customer is created and/or an existing digital profile is refined.

The digital profile of a customer may include master data. These are preferably, but not exclusively, the customer's address, date of birth and contact details.

The master data recorded in the customer's digital profile may further comprise preferences and/or interests and/or legal position concerning property of the customer.

The customer's digital profile can be used to increase security. For example, if a customer is based in Germany and registers from a distant country, the system can, among other things, request additional characteristics of the user in order to prove his identity and prevent misuse.

In addition, the digital profile of the customer makes it possible to get to know the customer better. The needs of the respective customer can be better assessed.

Based on the digital profile, relevant offers can be made to the customer at the right time and in the right circumstances, even before he has registered a corresponding need.

The creation of a digital profile requires the customer's consent to the collection and/or further processing of their data. The data and/or information of the customer's digital profile can be used for so-called email marketing and/or to perform customer data analysis.

The customer identity and access management enables the customer to present his identity to preferably a computer software and/or a computer platform by means of a password.

With the help of the password, the customer can preferably log in to a web shop. With the help of his password, he can move independently in a data-secured, personalised area, preferably a platform.

With the help of customer identity and access management, the customer can preferably, but not exclusively, use a "single sign-on" to gain uniform and convenient access to a broad-based offer system. With single sign-on access, the user obtains access to all computers and/or services, e.g. at his or her workplace, for which he or she is preferably locally authorised (authorization), by means of a one-time identification and/or a one-time authentication.

Thanks to the "single sign-on" system, the user can access all other computers and/or services from his workstation without having to have himself/herself identified and authorised every time.

The only prerequisite is that the user is authorised to access the predefined computers and/or predefined services.

A respective renewed identification and authentication is no longer required for access to the predetermined computers and for the predetermined services.

The identity and access management can further comprise a consistent data integration by means of a CRM system.

The invention understands a customer relationship management system under CRM system.

Within the customer relationship management, a provider directs his company specifically and consistently towards the customer.

Within the framework of customer relationship management or customer care, the provider of a product and/or service systematically designs its customer relationship processes.

Customer relationship management includes the documentation and administration of his relationships with customers. With the help of customer relationship management, the relationships between the provider of goods and/or services and the customers can be deepened and aligned in the long term.

Customer relationship management enables the supplier to have a preferably but not exclusively 360 degree view of his customer.

Customer relationship management opens up further points of contact for the supplier with his customer. The points of contact can be, for example, a website or a smartphone app.

The points of contact between the provider and the customer can also be ensured by a service advisor of the provider. Furthermore, the points of contact with the customer can be established via a local dealer and/or a telephone hotline.

Customer identity and access management enables the provider to streamline and/or improve its offer portfolio.

Offers to the customer can be delivered in a targeted and timely manner.

Data and/or information on the customer's behaviour can be collected and/or structured and/or stored.

Within the Customer Identity and Access Management, data and/or information for the formation of the customer profile can be summarised and/or evaluated from various sources.

Within the framework of customer identity and access management, the provider of goods and/or services can create a platform, preferably in the memory of his computer, which he and/or the customer can access.

With the help of the platform, the provider can create an interface to applications of other providers of goods and services.

The so-called Open API describes a scheme for the uniform specification and description of a programme interface, also called Application Programming Interface (API), so that other systems and developers can easily understand, use and integrate it.

Customer Identity and Access Management covers various functions in this way. It is a central success factor, preferably, but not exclusively, for digital business processes.

Customer Identity and Access Management requires a short time interval between the creation of the product and/or service and its introduction into the market.

The provider must be able to offer the goods and/or services to national and international customers in the same way and under the same conditions.

The products and/or services must be reliably available to customers at national and international level.

Mergers and acquisitions must be supported flexibly. Business models must be able to be newly developed and deployed without loss of time.

The cost structure for the offer of goods and/or services must be presented to the customer in a transparent and calculable way.

Known customer identity and access management systems are adapted to the needs of the customer within the framework of a product approach.

However, this approach often proves to be very time-consuming and/or cost-intensive. A high training and maintenance effort leads to high costs in the same way.

Cloud Services

The invention understands "cloud services" to mean preferably an "IT infrastructure" which is preferably made available via the Internet. Within the "cloud service", additional storage space and/or supplementary computing power is made available to the user.

Within the cloud services, the user can also receive application software as a service.

Known cloud service providers prefer to offer the user Identify-as-a-Service (IDaaS) solutions.

Known cloud services are, for example, AuthO or OKTA, which are exclusively available online.

The aforementioned cloud services are standardised solutions. However, the solutions offer the user only very limited scope for individual customisation.

Identity-as-a-Service

The invention understands the term "Identity-as-a-Service" (IDaaS) to mean preferably, but not comprehensively, an authentication infrastructure. The authentication infrastructure is preferably set up, operated and managed by a service provider. The Identity-as-a-Service service is preferably a single sign-on service for cloud services.

"Identity-as-a-Service" services lead to higher standardisation.

Inadequacies Methods for Executing an Identity and Access Management System in the Prior Art The installation of a software program product for an identity and access management system is often very time-consuming and therefore cost-intensive. The associated software product comprises a large number of components that have to be installed. The installation, preferably within the framework of a cluster operation, is very time-consuming, even if it always follows the same scheme.

The provision of the infrastructure for the implementation of methods for the execution of an identity and access management system in the given user environment often proves to be very time-consuming, as many specialist departments of the user are involved.

If a roughly comparable infrastructure is to be created conventionally, for example, at least two servers with the corresponding operating system must be provided per region. Otherwise, the manufactured solution would not be highly available because the failure of one server would directly lead to the failure of the system. A network with an appropriate firewall must be installed. In addition, so-called load balancers and/or certificates are required.

In a conventional installation, the infrastructure specifically required for the system must be established, which makes special demands on preferably, but not exclusively, firewalls, network configuration, certificates, load balancers etc. Since different departments/teams are often responsible for these components in companies, the processes are often complex and take a long time.

Often, with conventional installation, only an extremely low level of automation is created or achieved at all. This leads to the concrete consequence that, for example, when parts of a company are outsourced, the entire project has to be carried out again for the outsourced part.

The automations are therefore comparatively expensive to implement and cannot be transferred to other users.

So-called software-as-a-service solutions (SaaS solutions) are not applicable as possible alternatives for many users. Several users are set up as so-called "clients" on a single system.

Individual requirements of the user (single client) can only be taken into account to a limited extent, or not at all. The user (client) has no possibility to adapt in particular a software programme product to his individual requirements and circumstances during the installation (deployment) of the identity and access management system.

The user has no influence on the strategy and/or the project plan (roadmap) for the installation of the identity and access management system.

Known identity and access management systems often make the user very dependent on the respective system. For this reason, users often hesitate before implementing known identity and access management systems.

Furthermore, the user has no influence on the time at which changes are made to the identity and access management system.

The installation of an identity and access management system and/or an associated software programme product proves to be very time-consuming.

The users, due to the system, make the same mistakes independently of each other. In many cases, it is not possible to learn effectively from the errors across independent systems and software product programmes.

Known identity and access management systems and/or associated software products comprise a large number of standard tasks that are—due to the system—installed by every user. An adaptation of the identity and access management system and/or the associated software programme product to the specific needs of the user and/or to operational characteristics cannot be carried out, or only to a limited extent.

Known identity and access management systems cannot be used worldwide, or only to a limited extent. Performance problems and/or legal circumstances stand in the way of worldwide use of the identity and access management systems known from the prior art.

OBJECT OF THE INVENTION

The invention therefore has the object of providing a method and an associated system for executing an identity and access management system which eliminates the above-mentioned shortcomings of known systems.

SOLUTION OF THE PROBLEM

The problems are solved by a method for executing an identity and access management system according to the features of claim 1.

The tasks are further solved by the features of a system for executing the method according to claim 25.

The method for executing an identity and access management system provides a master computer which communicates with at least one slave computer.

In the method, the master computer comprises at least one component. The component is designed as a computing device and/or as a memory unit respectively.

The component is further designed as at least one working component.

According to the method, one unit of a functionality of the computing device and/or of the memory device respectively is generated. In addition, one unit of the functionality of the further working component of the master computer is generated respectively.

The respective units of functionality of the computing device and/or the memory device and/or the functionality of the further working component are converted into at least one code.

The units of the respective functionalities are transmitted in coded form from the master computer to the slave computer.

The master computer is controlled by means of the computing device.

To control the master computer at least one software program product is working.

Each unit of functionality of the software program product is converted into at least one code respectively.

The respective unit of functionality of the software program product is transmitted in coded form from the master computer to the slave computer.

The computing device and/or the memory device and/or the further work component and/or the software program product of the master computer are configured depending upon at least one parameter of the at least one slave computer.

The respective configuration is converted into a code.

The configuration is thus transmitted in coded form from the master computer to the slave computer.

In a memory device of the slave computer, data and/or information of a user is stored.

From the data and/or information of the user, a personal profile of the user is created in the computing device of the slave computer for the identification and/or authentication of the user and/or authorization of the user.

The units of functionality of the computing device and/or the memory device converted into code are transferred into the computing device and/or the memory device and/or into the further working component as well as into at least one runtime environment (Kubernetes) of the slave computer.

The code-converted units of the respective functionalities of the further working component and the code-converted units of the software program product and/or the configuration of the master computer are transferred to the computing device and/or to the memory device and/or to the further working component as well as to at least one runtime environment (Kubernetes) of the slave computer.

The user's data and/or information is processed and/or edited in the computing device and/or in the memory device and/or in the further working component of the slave computer. The editing and/or processing takes place there by means of the transferred functionalities of the software program product to the slave computer.

The code-converted units of the respective functionalities transferred from the master computer to the slave computer act on the computing device and/or on the memory device and/or on the further working component and/or on the software program product of the slave computer.

The at least one layer of the method will be discussed in detail below.

BACKGROUND OF THE INVENTION

Infrastructure as Code

When a software program product is installed, preferably as part of an identity and access management system, in an already existing data processing centre and/or computer, this is usually a very lengthy and cost-intensive process.

With the "Infrastructure as Code" approach, the user's requirements regarding the necessary hardware and/or the required software are programmed into a code.

The code can be a platform code.

With the help of "Infrastructure as Code", predefined hardware infrastructures and/or software infrastructures are provided with "cloud infrastructures".

By "cloud infrastructures", the invention means preferably, but is exclusively, systems such as "Amazon", "AWS", "Microsoft Azure" or "Google Cloud Platform".

It goes without saying that the preceding list is meant only by way of example.

Configuration as Code

By "configuration as code", the invention means the separation of the configuration to the specific need and/or specific requirement of a user from a product. By the term product, the invention preferably, but not exclusively, means a software program product.

Depending on the need and requirement of the user, the user-specific configuration of the product is separated from the product as such. The product is preferably, but not exclusively, a software program product.

The configuration is stored separately from the product as code and allows to react dynamically to the runtime environment. If, for example, the runtime environment is accessible under a certain Uniform Resource Locator (URL) (for example, kundenciam.de), this URL can be configured automatically so that the system can be addressed there. The URL is therefore not statically configured, but is dynamically configured at runtime. One of the advantages is that a user typically wants to operate several environments for development, testing and productive use. So there is no need to maintain three configurations, but the system can be rolled out three times and it will be dynamically accessible under development-system.kundenciam.de, test-system.kundenciam.de and productive-system.kundenciam.de (all URLs only as an example for clarification).

There are many other examples where this approach is clearly superior, including in responding to available resources. The system is able to adapt dynamically depending on how many users are currently using the system or, for example, which hardware versions are available in the runtime environment.

Clearly coded configurations are defined in an administration of different versions. The different codes can be compared with each other.

With the help of coding, a considerable increase in quality is achieved, since every change to the coding can be traced and manual, error-prone configuration changes are eliminated. Each code artefact can be reused at any time and/or with any user and/or with any identity and access management system.

The terms "infrastructure-as-code" and "configuration-as-code" will be further discussed separately below.

The invention provides that the installation of the identity and access management system and/or the installation of the associated software program product is fully automated.

The user is provided with the necessary infrastructure for the installation of the identity and access management system and/or the associated software program product in a cloud. The configuration of the identity and access management system and the associated software program product is carried out by transferring a code from the master computer to the slave computer.

The cloud environment explained above can be provided either by the user himself or by an external party. The former allows for further advantages in terms of security and governance. Since the user is a direct contractual partner of the cloud provider, he has all direct access options himself and can also assert, for example, audit rights. This represents a clear advantage over a complex contractual construct via subcontractors.

This advantage is made even more plausible by the fact that users can equip their own data processing centre with the same runtime environment (Kubernetes). In this case it is not even necessary to use a cloud service and the data remains completely under the user's control.

All artefacts of the identity and access management system and the associated software programme product required for production operation are transferred to the user in coded form.

Automatic backups and/or monitoring functions are transferred to the user in coded form on his slave computer.

Implementation of Identity and Access Management Systems with Kubernetes

The term "Kubernetes" is understood by the invention to mean a "runtime environment" or an "execution environment".

In the following, the term runtime environment is used. The runtime environment is a software program with which preferably software program products can be made executable within the framework of the identity and access management system, preferably in an unfamiliar environment.

The runtime environment preferably connects user software programs with the operating system pre-installed in the respective computer. The central aspect of Kubernetes is that it is designed for the execution of application programs in highly available environments. It thus represents a runtime environment for distributed, redundant systems across several computers.

Preferably, the identity and access management system can be designed as a microservice-based architecture.

The identity and access management system and/or the software programme product can be subdivided into individual microservices.

The identity and access management system and/or the software programme product can be extended and/or expanded independently of other components of the identity and access management system or the software programme product.

Configurations can be transferred in coded form from the master computer to any slave computer.

According to the invention, the time-to-market is reduced to a minimum of the time originally required.

With the transfer of coded units of the respective functionality from the master computer to the slave computer, a so-called "international rollout" is achieved without having to adapt market-specific requirements and/or regulatory and legal requirements to locally differing parameters.

Geographical and/or legal adaptations can be set up with the help of at least one code and transferred from the master computer to the slave computer.

For this purpose, it is sufficient to load a duplicate of a production environment into a memory device of a master computer.

The storage facility of the master computer can be a data processing centre or a local cloud.

In this way, installation times and set-up times can be minimised.

The master computers may each have host sites at locally different locations.

Host locations can be exemplary and in no way exclusively, located in any country and/or continent in the world.

This is advantageous because the user no longer has to deal with local and/or national and/or regional hosting issues.

The "hosting" according to the invention ensures short server latencies with simultaneous availability of support and service 24 hours a day, 7 days a week.

Identity and Access Management Systems and/or associated software programme products can be divided into different versions depending on the needs and/or requirements of the user. Regardless of any market- and/or user-specific adaptations, the basic version of the identity and access management system and/or the associated software programme product remains the same.

In this way, the development effort can be reduced across all versions. At the same time, process safety can be increased across all versions.

The basis for each new version is an already tried and tested version of the identity and access management system and/or the associated software program product.

Identity and Access Management Systems and/or associated software programme products can, as soon as they have been tested and accepted by users, continue to be used as so-called cloned systems and software programme products.

The consistency of the user data and/or information is ensured with the method according to the invention.

Instead of integrating user data management processes of the user directly into the slave computer of the user, the data and/or information is imported into a duplicated system in the master computer.

The tested and error-free data and/or information is preferably transferred in coded form from the master computer to the user's slave computer.

In this way, the systems of the master computer can be identical to the system of the slave computer.

Since in this way the systems of the master computer are identical to the system of the slave computer, the migration of data and/or information from the master computer to the slave computer can be carried out without great effort.

A planned production system of the user, including all necessary processes, can be tested in detail via the master computer.

Valuable user data remains on the slave computer and cannot be damaged.

After successful testing of the identity and access management system in the slave computer and after successful testing of the software programme product in the master computer, the tested and approved systems and software programme products can be transferred from the master computer to the slave computer.

Master Computer and Slave Computer

The relationship between the master computer and the slave computer describes a hierarchical management of access to common resources, data or information.

The resources comprise the units of functionality of the respective components of the master computer. The master computer comprises as components at least one computing device and/or at least one memory device. An additional component of the master computer is the further working component.

The further working component can be any hardware unit of the master computer which is required for the execution of a computer program product.

The master computer communicates with at least one slave computer.

The master computer is designed to generate functional units of its computing device and/or functional units of its memory device and/or functional units of another working component.

To transmit the unit of the respective functionality from the master computer to the slave computer, the respective unit of the functionality of the computing device and/or of the memory device and/or of the functionality of the further working components is converted into a code.

Depending on the needs and/or requirements of the user, the units of the respective functionality are transferred in coded form from the master computer to the slave computer.

The master computer also includes a software programme product. The software program product of the master computer controls the master computer.

The master computer generates preferably by means of its computing device units of functionality of the software program product.

The respective unit of functionality of the software program product of the master computer is converted into a code.

To the extent and/or to the degree that the slave computer requires the respective units of functionality of the master computer, the units of functionality are transferred in coded form from the master computer to the slave computer.

The master computer includes a memory device. The memory device is designed as a data memory or as a storage medium and is used to store data and/or information.

The memory device of the master computer can be an electronic component. It can also be a data carrier or a storage medium. The memory device may be a cloud where data and/or information is stored via the Internet.

The invention preferably understands the term "computing device" to mean an electronic switching device for executing instructions of a software program product. The computer's computing device has building blocks for programming, with which any processing logic for data can be represented.

By way of example and in no way exclusively, the computing device of the master computer is an arithmetic logic unit (ALU).

Code

A code is a specification in which each character of a first character set is uniquely assigned a character and/or character string from another character set.

In the present invention, the code serves to exchange data and/or information between the master computer and the slave computer.

Preferably, the code serves to transfer units of functionality of the computing device and/or the memory device and/or the further working component of the master computer to the slave computer.

The code serves to transfer the unit of functionality of the software program product from the master computer to the slave computer.

To transfer the respective units from the master computer to the slave computer, the respective unit of functionality is converted into at least one code. The respective unit of functionality is thus transmitted in coded form from the master computer to the slave computer.

For the transmission of the code, the master computer and/or the slave computer comprise at least one information-formulating entity (recorder/transmitter).

The master computer and/or the slave computer additionally comprise at least one information-receiving entity. The information-receiving entity is designed as a reading device or as a receiver.

The coded unit of the respective functionality is transmitted as information in coded form between the master computer and/or the slave computer.

The transmission of units of the respective functionality takes place from the master computer to the slave computer.

The transmission of data and/or information, preferably in the form of units of a respective functionality may also be transmitted from the slave computer to the master computer.

At least two codes can be stored in at least one code memory device (code repository).

By code memory device, the invention means a device of the computing device and/or the memory device of the master computer, in which each version of the identity and access management system and/or each version of the software program product is managed.

In the code memory device, all versions of the units of functionality, preferably of the computing device and/or the memory device and/or the further working component, are converted into the respective code, bundled and stored.

All codes of the respective units of functionality are managed and structured in the code memory device.

With the help of predefined rules, the code is continuously provided by the master computer. With the help of the rules, the code is continuously integrated into the slave computer.

When the at least one code is transferred from the master computer to the slave computer, the code is provided and/or integrated into the slave computer with the aid of a predefined automation infrastructure (CI/CD).

The code that is transferred from the master computer to the slave computer is preferably a text file and in particular follows a predefined semantic.

The automation infrastructure applies dynamic changes during the transfer from the master computer to the slave computer based on existing runtime conditions. What these are is specified by the "configuration-as-code". The "configuration-as-code" can be carried out for example, but not exclusively, with the help of the Go-Templating-Language. This is a language for the semantic description of logical dependencies for the modification of arbitrary outputs. It is implemented in the Go programming language.

Unit of Functionality

The unit of the respective functionality and/or the unit of the configuration are adapted and/or adjusted before or during or after the transmission from the master computer to the slave computer.

The transmission of the respective unit of functionality and/or configuration takes place individually or in so-called packages.

The unit of the respective functionality and/or configuration is scaled before or during or after the transmission from the master computer to the slave computer.

By the term "scaling", the invention understands a subdivision and/or an evaluation of the units of the functionalities or the configuration according to a certain ranking, preferably according to physical quantities.

The units of functionality and/or configuration may be scaled before or during or after transmission according to predetermined numerical values and/or units of measurement. The preceding list is only exemplary and in no way intended to be exhaustive.

By transmitting the unit of functionality or configuration converted into at least one code, preferably the capacity of the computing device and/or the capacity of the memory device and/or the capacity of the further working component is expanded and/or changed.

By transferring the unit of functionality and/or configuration of the software program product converted into at least one code, the capacity and/or areas and/or steps of the software program product are expanded and/or changed. Again, the enumeration is only exemplary and in no way meant to be exhaustive.

The units of functionality and/or configuration transferred from the master computer to the slave computer are each designed as a service. The service is provided by the master computer for the slave computer.

The service is performed by the master computer on the computing device and/or on the memory device and/or on the other working component of the slave computer respectively.

The transfer of at least one unit of the functionality and/or the configuration of the software programme product of the master computer to the slave computer is carried out as a service. The service is performed from the master computer to the slave computer.

The transmission of the unit of functionality and/or configuration converted into code from the master computer to the slave computer is carried out preferably automatically.

It goes without saying that the transmission can also take place manually or according to predetermined rules.

The software programme product is designed as system software. The software program product may be support software. It can also be application software. The enumeration is only to be seen as an example and is in no way meant to be conclusive.

Runtime Environment (Kubernetes)

In the sense of the invention, the term "runtime environment" describes the available and defined prerequisites of a runtime system, preferably in the slave computer, which are necessary for the operation, preferably of the software program product.

The runtime environment (Kubernetes) is defined by elementary components of a programming language. The elementary components of the programming language are preferably, but not comprehensively, the behaviour of language constructs and/or functions such as type checking, debugging or a code generation or a code optimisation.

The runtime environment comprises at least one runtime library and/or standard library and/or programming interfaces.

The runtime environment comprises runtime variables. Hardware and software components may be provided via operating system functions.

The runtime environment comprises at least one function with which preferably a monitoring and/or a sequence check can be carried out.

The runtime environment comprises at least one function with which a debugging process and/or a code generation and/or a code optimisation can be carried out.

The runtime environment can be used to set up and operate interfaces.

A "single sign-on process" can also be executed by the software system introduced into the runtime environment.

The transfer of the units of functionality and/or configuration from the master computer to the slave computer can take place on at least two runtime environments simultaneously and/or automatically.

Runtime environments are arranged in parallel or in series with each other.

Runtime environments are arranged at locally different locations.

Runtime environments are adapted to locally differing parameters.

The runtime environment allows containers to be executed. The identity and access management system of the invention follows the microservice architecture concept and the runtime environment is designed to be able to execute systems that follow this concept particularly well. A microservice is the smallest possible component in a distributed system.

At least two runtime environments are configured in clusters of runtime environments (Kubernetes clusters).

Layers

The respective layer of the layered architecture is referred to as the "service layer". In the following, however, the term "layer" is used as simplification.

The components and/or the code storage facility of the master computer and/or the slave computer are structured in at least two layers that differ from each other.

The units of the functionalities and/or the configurations and/or the associated codes and/or the predetermined rules for providing or integrating the codes, are each structured in at least two layers that differ from one another.

The units of the software program product converted into codes and/or the at least two parameters for configuration are each structured in at least two layers that differ from one another.

Similarly, at least two runtime environments can each be structured in at least two layers that differ from one another.

The at least one unit of functionality of the software program product and/or the configuration are structured according to an internal dependency and/or according to an external dependency in at least two layers.

The structuring of the unit of functionality of the software program product and/or the configuration may be structured according to an external dependency and/or according to an integration logic and/or according to a basic configuration separately in at least two layers.

The at least one unit of functionality of the computing device and/or the at least one unit of functionality of the memory device and/or the at least one unit of functionality of the working component and/or the at least one unit of functionality of the software program product, may be structured according to at least one internal reference in at least two layers. The structuring in at least two layers may also be structured separately in layers according to a given user configuration and/or according to a deployment abstraction (the part of the configuration that relates to an environment has to be abstracted).

The at least one unit of functionality of the computing device and/or the at least one unit of functionality of the memory device and/or the at least one unit of functionality of the working component may be structured in at least two layers depending on at least one infrastructure configuration and/or depending on at least one cluster service configuration and/or depending on a user service configuration.

The at least one unit of functionality of the software program product can be structured in at least two layers depending on at least one infrastructure configuration and/or depending on at least one cluster service configuration and/or depending on at least one user service configuration.

The structuring enables a layered architecture according to hierarchical levels that differ from one another.

The respective layers can be connected to each other by assigning references and/or can be integrated into each other. A layer can, if necessary, override another layer.

Each layer can preferably comprise at least two so-called "sub-layers".

Layer Architecture

For clarification, the layer architecture is explained in more detail using the example of three assumed layers. Purely by way of example and in no way exclusive, a first layer is assumed (denoted: component), which refers to the software programme product of the master computer.

A second layer (denoted: user service) comprises the configuration of the hardware components of the slave computer and/or the configuration of the software programme product according to the requirements and particularities of the user.

The third layer (designated: user stage) preferably concerns the units of functionality of the hardware components, which are transmitted from the master computer to the slave computer as respective units of functionality in coded form.

The layers of the layer architecture form the basis for the structuring of the respective codes. With the help of the layered architecture, the code storage facilities (code repository) and the artefacts (files used by the automation infrastructure for further processing) can be created. They are, for example, precompiled software code, containers and other files) can be structured.

The respective layers form the automation infrastructure within the process for executing the identity and access management system, as well as the associated software programme product.

The layers of the layered architecture serve to realise and/or ensure continuous installation and continuous integration of the units of functionality and/or configuration that are communicated and transferred from the master computer to the slave computer.

Using the layered architecture, specific user environments can preferably be transferred and installed from the master computer to the slave computer in coded form.

With the help of the automation infrastructure, the data and/or information defined in the respective layer architecture can be used across at least two users.

With the help of the automation infrastructure, different versions of identity and access management systems and/or of the associated software program products can be developed and/or fully installed on the slave computer.

Specific changes to the identity and access management system and the associated software programme product can be developed and tested for the respective user in the master computer.

The tested changes are transferred from the master computer in coded form to the slave computer, where they are implemented and configured to the respective requirements and needs of the user.

With the help of the layers of the layered architecture, a layered architecture of the slave computer can be reproduced in the master computer.

The layered architecture of the slave computer replicated in the master computer enables the installation and/or testing of any special features and/or requirements necessary for the user's slave computer. The replication of the user's slave computer in the master computer includes the complete environment of the slave computer with all the necessary environments under the control of the layers of the layered architecture.

The data or information of the hardware components of the master computer and the associated software programme product are configured within the master computer to the requirements and needs of the user.

The units of functionality configured for the user are then communicated and transferred from the master computer to the slave computer.

The configuration files comprising the user's configuration data and/or information are transferred in codes and transmitted in the form of the codes across all layers from the master computer to the slave computer using, for example, but not limited to, a go-templating language.

The configuration files to be transferred from the master computer to the slave computer can comprise and/or map at least one logic. In this way, it is possible to react flexibly and dynamically to user dependencies or parameters by means of the configuration.

First Layer (Designated: Component)

In the context of the first layer, the invention understands the term "internal dependency" to mean a reference of the respective first layer, preferably to any hardware component, in order to thus make the layer dependent on the respective hardware component.

The term "external dependency" expresses a dependency of the respective layer preferably to external software libraries. The term "software library" is preferably, but not exclusively, understood to mean an "open source". It can also mean "docker images" or "helm charts".

The internal and/or external dependencies are copied into the infra-structure of the layered architecture. Within the framework of the master computer, the internal and/or external dependencies are checked for so-called vulnerabilities (preferably CVEs) or for licence compatibility.

The term "integration logic" describes that a logic is preferably implemented in the respective layer in order to integrate the respective component with preferably at least one cluster service. The term integration logic furthermore includes automated monitoring of availability and/or monitoring of metrics. Additionally, integration into a centralised log management is also included. Additionally, the term may also mean an implementation of required logics for installation, preferably of software program products.

By the term "basic configuration", the invention understands the configuration of so-called use cases, with the help of which projects can be started with less time expenditure.

The so-called basic configuration can preferably be combined with other hardware components or with software components or integrated into other components. However, a dependency between the basic configuration and the respective component is not required.

The configuration is transferred from the master computer to the slave computer in a tried and/or tested state.

The aforementioned first layer is preferably designed as a cluster service. It can also be a basic component (one or more basic components are referenced and configured in a user service—see next layer—in order to configure the user-specific part and realise the IAM use cases. They represent the basis or foundation for higher-value components.).

A "cluster service" is operated by at least two layers (so-called service layers). A cluster service can be user-specific.

The cluster service is preferably, but not exclusively, represented as a centralised "logging system". The cluster service can also be an automated monitoring system or a so-called "tagger".

By means of the tagger resource evaluations are carried out in cloud environments.

At least one so-called basic component can be referenced and configured with the second layer (designated: user service).

With the help of the "user service" layer of the layer architecture, the user-specific part of the respective units of the functionalities is configured. At the same time, an identity and access management use case is realised.

Second Layer (Designated: User Service)

The layer of the layer architecture "user service" is the centre of the identity and access management system from the respective user's perspective.

All data and/or information that is user-specific is bundled in the form of configurations in the second layer (referred to as user service). In the context of the second layer of the layered architecture (designated: user service), the invention understands the term "internal references" to mean a reference to one or more basic components within the layered architecture.

The term "user configuration" includes a complete user-specific configuration according to the needs and/or requirements of the user. Here, the basic configuration can be supplemented by further data and/or information of the user and, in particular, can also be overwritten.

Supplementing and/or overwriting the basic configuration enables further realisation of the user's individual requirements.

In addition, codes or parts of codes of the configuration of the basic components can also be overwritten or supplemented.

In this way, comprehensive flexibility is achieved within the identity and access management system.

By the term "installation abstraction" (deployment abstraction), the invention understands that the part of the configuration that relates to an environment must be abstracted.

An environment-specific part of the configuration differs depending on the progress of the installation.

As an example, but in no way exclusively, the URL under which the identity and access management system can be reached will have to be configured differently depending on the system.

As a result, the configuration will not take place in the aforementioned second layer (referred to as user service). Rather, this part of the configuration is abstracted as an environment variable. The configuration takes place only at the time of installation of the system.

The same artefacts are thus used in different environments.

In this way, quality assurance is ensured over a large number of installations.

An abstraction of the configuration part preferably includes passwords of individual systems or versions.

The so-called user component is a logical component. The logical component may comprise at least two so-called "subsystems and/or subcomponents". The subsystems and/or subcomponents constitute a complex overall system.

The combination of the user service layer into a user component enables a subdivision of the identity and access management system into different versions.

The overall system can be transferred to other environments (stages).

The overall system can also be made available in a single stage.

Third Layer (Designated: User Stage)

The third layer (referred to as the user stage) is run through for each phase of the identity and access management system that the user requires.

The first layer (component) and the second layer (user service) essentially concern at least one software programme product (software artefacts).

The third layer "user stage" preferably, but not exclusively, comprises hardware components. Hardware components are preferably, but not exclusively, the computing device and/or the memory device and/or the at least one working component of the respective computer.

With the third layer (designated: user stage), preferably units of the functionality of the computing device and/or the memory device and/or the further working component of the master computer are transmitted from the master computer to the slave computer.

The transmission takes place in coded form.

The third layer (designated: user stage) leads to an executable and usable identity and access management system at the slave computer.

In the context of the third layer, the invention understands the term "infrastructure configuration" to mean the case of a system in which at least one runtime environment (Kubernetes) is provided.

The runtime environment is configured by means of a code. This is a so-called "infrastructure-as-code" approach.

The infrastructure configuration includes the configuration of at least two accesses to at least two infrastructure components.

Within the infrastructure configuration, the type of resources used and the limits set for automatic, elastic scaling relative to runtime are configured according to the needs and/or requirements of the user.

Preferably, but not exclusively, it is determined how many so-called "worker nodes" can be added, at high load, in clusters and dynamically, preferably in a cloud environment.

In the context of the third layer (designated user stage), the invention understands the term "cluster services configuration" to mean a reference of the cluster services to be used to one another.

For the respective cluster services used, those parts that are stage-specific, are configured.

For example, but in no way comprehensive, an automated monitoring is activated. Due to the specific configuration of the stages, an alarm, preferably of a support staff, is only triggered in the productively used stage, but not, for example, in stages used for testing.

In the context of the term "user service configuration", the data and/or information is configured, which was preferably configured in a sub-layer "deployment abstraction".

Within the scope of the user service configuration, resource limits of individual components can preferably be overwritten.

By way of example, but in no way comprehensive, more resources are used by the components in a further stage "production" than in a further layer "quality assurance stage".

Illustration of a Layered Architecture using the Example of Automatic Registration for Monitoring In this example, it is assumed that each component has an interface to the respective external environment.

It is further assumed that the first layer (designated: component) comprises a sub-layer "integration logic".

In the integration logic sub-layer of the first layer it is defined how the first layer is monitored. It is further defined in which cases alarms are to be sent out.

A cluster service "Active Monitor Watcher" is provided, which monitors an installation in a cluster.

If further additional services are added to the identity and access management system, the configuration is dynamically evaluated. The dynamically evaluated configuration is registered with an external monitoring service via an API.

The component installed in this way is automatically monitored.

Depending on the respective user configuration, alarm messages are sent directly to the support staff in case of specific problems.

This proves to be particularly advantageous, as it is not necessary to set up a complete monitoring system for each individual user. Instead, the cluster service "Active Monitor Watcher" can react to the respective current state. Necessary configurations are carried out automatically.

The cluster service "Active Monitor Watcher" proves to be extremely advantageous, as availabilities and non-availabilities of exposed endpoints can be monitored automatically.

Preferably, but not exclusively, the cluster service is supplemented by a so-called "health service".

The so-called "health service" allows to describe test cases for the overall system in a preferably descriptive and/or human-readable language. This can be, for example, but not exclusively, the language Gherkin.

The test cases for the entire system go beyond a mere availability check.

As an example and also not comprehensively, a single sign-on scenario can be tested across several systems.

The "health service" makes it possible for the user to specify so-called performance target values for component response times.

For the validation of so-called service level agreements, tests can be carried out with recourse to a human-readable language, with which the service level agreements can be validated.

The validation can be carried out together with the user.

The validation can also be checked automatically.

With the help of the aforementioned "Active Monitor Watcher", the health service can have test cases monitored automatically. With the help of the "Active Monitor Watcher", alarm signals can be sent to available support staff.

In addition, so-called reporting values can be reported back by the support staff.

Global Token Processing

Identity and Access Management systems from different countries or regions each have at least one token independently of each other.

The respective tokens of the different countries or regions are incompatible with each other.

To decrypt the respective national or regional tokens, keys must be distributed worldwide.

The distribution of such keys poses a particular security risk. The exchange of data within such tokens between individual countries and/or regions may be inadmissible for legal reasons.

This worldwide verification is carried out without having to replicate personal data between the respective countries and/or regions.

Intelligent User Roaming

The invention provides that, within the framework of the identity and access management system, data and/or information are divided into at least two areas.

A first profile is preferably readable by the user in plain text. However, the readability does not include passwords and stored knowledge.

According to the invention, a global profile is provided.

The global profile comprises at least two attributes of the local profile.

The attributes of the local profile can be formed in the global profile in a non-recoverable and/or a non-readable form. This is a so-called hash.

The global profile preferably, but not exclusively, comprises so-called one-to-one identifiers.

For example, but not exclusively, to perform a login in at least one other region, a so-called hash of a login name must be entered.

The hash of the login name refers in particular to a value that the user enters when logging in. This can be, in particular, the e-mail address or the mobile phone number of the user.

In addition, a so-called hash of the password must be provided.

The local profile can be supplemented with further, especially user-specific, attributes. In this way, users in other regions can also connect to the system of the respective region without having to transfer and save the complete profile. The user's digital services can thus be used without compromise, for example, when travelling.

Automatic Detection of an LDAP Topology for Replication

Within the framework of the layer architecture, a so-called "topology configurator" can preferably be integrated in a sub-layer of the "component" layer.

The sub-layer is designed as "integration logic".

Such a topology configurator is preferably executed at the start of a so-called pod. A target/performance comparison is carried out with the help of the topology configurator.

With the help of the target/performance comparison, the role of a so-called pod in the present identity and access management system is recognised and configured.

The topology configurator performs further steps to enable the so-called pod to preferably delete existing data and/or make backups from other systems.

In this way, a pod can react dynamically to the existing situation of the runtime environment and other pods belonging to the same LDAP cluster. It can independently determine whether it is needed in the role of master or slave and, depending on this, dynamically configure itself.

It goes without saying that the pod can also include other functions.

The invention claimed is:

1. A method for implementing an identity and access management system, in which at least one layer is provided and a master computer communicates with at least one slave computer, wherein the master computer comprises at least one component which is designed as a computing device and/or as a memory device and/or as a further working component respectively, wherein respective units of functionality of the computing device and/or of the memory device and/or of the further working component of the master computer are generated, and the respective units of the functionality of the computing device and/or of the memory device and/or the further working component are converted into a code and are transmitted in coded form from the master computer to the slave computer, wherein the master computer is controlled with the aid of the computing device, and for control at least one software program product operates, wherein units of functionality of the software program product respectively are converted into a code and are transmitted in coded form from the master computer to the slave computer, wherein the computing device and/or the memory device and/or the further working component and/or the software program product of the master computer are configured in dependence of at least one parameter of the at least one slave computer, and a respective configuration is converted into a code and transmitted in coded form from the master computer to the slave computer, wherein data and/or information of a user are stored in a memory device of the slave computer, and a personal profile for identification and/or authentication and/or authorisation of the user is created from the data and/or information in the computing device of the slave computer, wherein the units of the functionality of the computing device and/or of the memory device converted into a code and/or the units of the functionality of the further working component and/or of the software program product converted into a code and/or the configuration are transferred from the master computer into the computing device and/or into the memory device and/or into the further working component as well as into at least one runtime environment of the slave computer, wherein the data and/or information of the user in the computing device and/or in the memory device and/or in the further working component of the slave computer are processed and/or edited with the transmitted functionalities of the software program product, the converted code and/or units of the respective functionalities transferred from the master computer to the slave computer act on the computing device and/or on the memory device and/or on the further working component and/or on the software program product of the slave computer, wherein at least one layer is part of a layered architecture and the components and/or a code storage facility of the master computer and/or of the slave computer are structured in at least two layers that differ from each other, and a first layer refers to the software program product of the master computer, a second layer comprises configuration of hardware components of the slave computer and/or configuration of the software program product, and a third layer concerns units of functionality of the hardware components, which are transmitted from the master computer to the slave computer as respective units of functionality in coded form.

2. A method according to claim 1, characterized in that at least two codes are stored in at least one code memory device (code repository).

3. A method according to claim 1, characterised in that the at least one code is continuously provided and/or continuously integrated (CI/CD) with predetermined rules.

4. A method according to claim 3, characterised in that the components and/or the code memory device and/or the rules and/or the converted units and/or the at least one software program product and/or the at least one codes and/or the at least one parameter and/or the at least one runtime environment respectively are each structured in at least two layers which differ from one another.

5. A method according to claim 1, characterised in that the at least one code is provided and/or integrated with a predetermined automation infrastructure.

6. A method according to claim 1, characterised in that the at least one code is processed with a templating language.

7. A method according to claim 1, characterised in that the code is a text file and/or follows a predetermined semantics.

8. A method according to claim 4, characterized in that the at least one unit of the functionality of the software program product is structured in layers according to an internal dependency and/or according to an external dependency and/or according to an integration logic and/or according to a basic configuration.

9. A method according to claim 1, characterized in that the at least one unit of the functionality of the computing device and/or the at least one unit of the functionality of the memory device and/or the at least one unit of the functionality of the working components and/or the at least one unit of the functionality of the software program product are structured separately, in layers, at least according to an internal reference and/or according to a user configuration and/or according to a deployment abstraction.

10. A method according to claim 1, characterized in that the at least one unit of the functionality of the computing device and/or the at least one unit of the functionality of the memory device and/or the at least one unit of the functionality of the working component and/or the at least one unit of the functionality of the software program product are structured in layers depending on at least one infrastructure configuration and/or at least one cluster service configuration and/or at least one user service configuration.

11. A method according to claim 1, characterized in that the units of functionality and/or the configuration are adapted before or during or after transmission.

12. A method according to claim 1, characterized in that the transmission of the units of functionality and/or configuration takes place individually or in packets.

13. A method according to claim 1, characterized in that the units of functionalities are scaled before or during or after the transmission.

14. A method according to claim 1, characterized in that the capacity of the computing device and/or the memory device and/or the further working component and/or the software program product of the slave computer is expanded and/or changed by the transmission of the unit of functionality converted into at least one code.

15. A method according to claim 1, characterized in that the units of the functionalities transferred from the master computer to the slave computer respectively are designed as a service which respectively is performed on the computing device and/or on the memory device and/or on the further working component.

16. A method according to claim 1, characterized in that the transfer from the master computer to the slave computer takes place automatically.

17. A method according to claim 1, characterized in that the runtime environment comprises at least one function with which preferably a monitoring and/or a sequence check and/or a debugging process and/or a code generation and/or a code optimisation and/or an interface is executed.

18. A method according to claim 1, characterized in that the transfer of the units of the functionalities and/or the configuration from the master computer to the slave computer takes place simultaneously and/or automatically on all runtime environments.

19. A method according to claim 1, characterized in that the at least two runtime environments are arranged in parallel or serially next to each other.

20. A method according to claim 1, characterized in that the runtime environments are arranged at locations which differ locally from one another.

21. A method according to claim 1, characterized in that the runtime environments are adapted to locally differing parameters.

22. A method according to claim 1, characterized in that the identity and access management system is designed as a container, preferably as a micro-service.

23. A method according to claim 1, characterized in that the runtime environments are configured in clusters of runtime environments (Kubernetes cluster).

24. A method according to claim 1, characterised in that the software program product is a system software or a support software or an application software.

25. A system for implementing an identity and access management system, characterized in that a master computer communicates with at least one slave computer,
  wherein the master computer comprises at least one component, which is designed as a computing device and/or as a memory device and/or a further working component respectively, wherein
  respective units of the functionality of the computing device and/or of the memory device and/or of the further working component of the master computer are generated, and
  the respective units of the functionality of the computing device and/or of the memory device and/or of the functionality of the further working component are converted into a code and are transmitted in coded form from the master computer to the slave computer,
  wherein the master computer is controlled with the computing device, and at least one software program product operates for control,
  wherein units of the functionality of the software program product respectively are converted into a code and are transmitted in coded form from the master computer to the slave computer,
  wherein the computing device and/or the memory device and/or the further working component and/or the software program product of the master computer are configured in dependence on at least one parameter of the at least one slave computer, and
  a respective configuration is converted into a code and transmitted in coded form from the master computer to the slave computer,
  wherein data and/or information of a user are stored in a memory device of the slave computer, and
  a personal profile for identification and/or authentication and/or authorisation of the user is created from the data and/or information in the computing device of the slave computer,
  wherein the units of the functionality of the computing device and/or of the memory device converted into a code and/or the units of the functionality of the further working component and/or of the software program product converted into a code and/or the configuration are transferred from the master computer into the computing device and/or into the memory device and/ or into the further working component as well as into at least one runtime environment (Kubernetes) of the slave computer, wherein the data and/or information of the user in the computing device and/or in the memory device and/or in the further working component of the slave computer are processed and/or edited with the transmitted functionalities of the software program product, the converted code and/or units of the respective functionalities transferred from the master computer to the slave computer act on the computing device and/or on the memory device and/or on the further working component and/or on the software program product of the slave computer, wherein at least one layer is part of a layered architecture and the components and/or a code storage facility of the master computer and/or of the slave computer are structured in at least two layers that differ from each other, and a first layer refers to the software program product of the master computer, a second layer comprises configuration of hardware components of the slave computer and/or configuration of the software program product, and a third layer concerns units of functionality of the hardware components, which are transmitted from the master computer to the slave computer as respective units of functionality in coded form.

\* \* \* \* \*